United States Patent
Sakamoto (10) Patent No.: US 6,785,424 B1
(45) Date of Patent: Aug. 31, 2004

(54) ENCODING METHOD AND APPARATUS FOR COMPRESSING A DATA STRUCTURE HAVING TWO OR MORE DIMENSIONS, DECODING METHOD, AND STORAGE MEDIUM

(75) Inventor: Yoichi Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 09/637,626

(22) Filed: Aug. 14, 2000

(30) Foreign Application Priority Data

Aug. 13, 1999 (JP) .......................................... 11-229280

(51) Int. Cl.⁷ ................................................. G06K 9/36
(52) U.S. Cl. ....................... 382/244; 382/239; 358/1.15
(58) Field of Search ................................ 382/232, 235, 382/244, 239, 162, 233, 245; 358/1.15, 1.13, 1.16, 1.17; 341/51

(56) References Cited

U.S. PATENT DOCUMENTS

| | | | |
|---|---|---|---|
| 5,617,517 A | * | 4/1997 | Chi ............................ 358/1.15 |
| 5,877,711 A | * | 3/1999 | Craft ........................... 341/51 |
| 6,238,105 B1 | * | 5/2001 | Pardo ......................... 358/1.17 |
| 6,542,631 B1 | * | 4/2003 | Ishikawa ..................... 382/162 |

FOREIGN PATENT DOCUMENTS

| | | | |
|---|---|---|---|
| JP | 8-23447 | 1/1996 | ............ H04N/1/41 |
| JP | 8-289157 | 11/1996 | ........... H04N/1/411 |
| JP | 9-289591 | 11/1997 | .......... H04N/1/413 |

* cited by examiner

*Primary Examiner*—Wenpeng Chen
(74) *Attorney, Agent, or Firm*—Fitzpatrick, Cella, Harper & Scinto (57) ABSTRACT

On the basis of a bit sequence of a given command code, it is determined to which of repetition, copying and raw-data substitution the bit sequence applies. Based upon the result of the determination made, the data lengths of each of repetition, copying and raw data are calculated. In accordance with the calculations, at least two results from among results of repetition, copying and raw-data substitution of the encoding are combined and encoded as a command of one byte.

22 Claims, 8 Drawing Sheets

| COMMAND | COMMAND CODE | | | | | | | | MEANING |
|---|---|---|---|---|---|---|---|---|---|
| EOL | 0 | 0 | 0 | 0 | 0 | 0 | 0 | 0 | COPY TO END OF LINE |
| COPY THEN REPEAT | 0 | 0 | L2 | L1 | L0 | S2 | S1 | S0 | COPY(0≦S≦7)BYTES, THEN REPEAT NEXT BYTE(2≦L≦7)TIMES |
| COPY THEN RAW | 0 | 1 | R2 | R1 | R0 | S2 | S1 | S0 | COPY(0≦S≦7)BYTES, THEN ADOPT(1≦R≦7)BYTES OF RAW DATA |
| REPEAT THEN RAW | 1 | 0 | L2 | L1 | L0 | R2 | R1 | R0 | REPEAT NEXT BYTE(2≦L≦7)TIMES, THEN ADOPT(1≦R≦7)BYTES OF RAW DATA |
| COPY LONG | 1 | 1 | 0 | S4 | S3 | S2 | S1 | S0 | COPY(1≦S≦31) × 8 BYTES |
| EXTEND | 1 | 1 | 1 | E4 | E3 | E2 | E1 | E0 | ADD(1≦E≦31) × 8 BYTES TO COUNT OF NEXT COMMAND |

| COMMAND | COMMAND CODE | | | | | | | | MEANING |
|---|---|---|---|---|---|---|---|---|---|
| EOL | 0 | 0 | 0 | 0 | 0 | 0 | 0 | 0 | COPY TO END OF LINE |
| COPY THEN REPEAT | 0 | 0 | 0 | L2 | L1 | L0 | S2 | S1 | S0 | COPY($0 \leq S \leq 7$)BYTES, THEN REPEAT NEXT BYTE($2 \leq L \leq 7$)TIMES |
| COPY THEN RAW | 0 | 0 | 1 | R2 | R1 | R0 | S2 | S1 | S0 | COPY($0 \leq S \leq 7$)BYTES, THEN ADOPT($1 \leq R \leq 7$)BYTES OF RAW DATA |
| REPEAT THEN RAW | 0 | 1 | 0 | L2 | L1 | L0 | R2 | R1 | R0 | REPEAT NEXT BYTE($2 \leq L \leq 7$)TIMES, THEN ADOPT($1 \leq R \leq 7$)BYTES OF RAW DATA |
| COPY LONG | 1 | 1 | 0 | S4 | S3 | S2 | S1 | S0 | COPY($1 \leq S \leq 31$) × 8 BYTES |
| EXTEND | 1 | 1 | 1 | E4 | E3 | E2 | E1 | E0 | ADD($1 \leq E \leq 31$) × 8 BYTES TO COUNT OF NEXT COMMAND |

FIG. 4

| COMMAND | COMMAND CODE | | | | | | | | MEANING |
|---|---|---|---|---|---|---|---|---|---|
| COPY THEN REPEAT LONG | 0 | 0 | L2 | L1 | L0 | S2 | S1 | S0 | COPY($0 \leq S \leq 7$)BYTES, THEN REPEAT NEXT BYTE($0 \leq L \leq 7$) + E × 8 TIMES |
| COPY THEN RAW LONG | 0 | 1 | R2 | R1 | R0 | S2 | S1 | S0 | COPY($0 \leq S \leq 7$)BYTES, THEN ADOPT ($0 \leq L \leq 7$) + E × 8 BYTES OF RAW DATA |
| REPEAT LONG THEN RAW | 1 | 0 | L2 | L1 | L0 | R2 | R1 | R0 | REPEAT NEXT BYTE($0 \leq L \leq 7$) + E × 8 TIMES, THEN ADOPT($1 \leq R \leq 7$)BYTES OF RAW DATA |
| REPEAT THEN RAW LONG | 1 | 1 | L2 | L1 | L0 | R2 | R1 | R0 | REPEAT NEXT BYTE($2 \leq L \leq 7$)TIMES, THEN ADOPT($0 \leq R \leq 7$) + E × 8 BYTES OF RAW DATA |

```
1.  int encode(unsigned char *src, unsigned char *dst, int width, int height)
2.  {
3.      int x, y, len, len2, copy, copy2, limit ;
4.      unsigned char data, *dsttop=dst ;
5.      for(y=0 ; y<height ; y++, src+=width){
6.          for(x=0 ; x<width){
7.              copy=0
8.              if(y !=0){
9.                  while(x<width && src[x]==src[x-width]){
10.                     x++ ; copy++ ;
11.                 }
12.                 if(x==width){
13.                     *dst++=0x00 ;
14.                     break ;
15.                 }
16.                 while(copy>7){
17.                     copy2=min(copy/8, 31) ;
18.                     *dst++=0xc0+copy2 ;
19.                     copy-=copy2*8 ;
20.                 }
21.             }
22.             if(x+1<width && src[x]==src[x+1]){
23.                 data=src[x] ;
24.                 for (x+=2, len=2 ; x<width && len<255 ; x++, len++){
25.                     if(src[x] !=data)break ;
26.                 }
27.                 if(copy==0){
28.                     if(len>7)limit=7 ; else limit=255 ;
29.                     len2=count_raw(src, x, y, width, limit) ;
30.                     if(len2>7){
31.                         *dst++=0xe0 | (len2>>3);
32.                         *dst++=0xe0 | (len&7)<<3 | (len2&7) ;
33.                         *dst++=data ;
34.                         memcpy(dst, src+x, (len2) ;
35.                         dst+=len2 ; x+=len2 ;
36.                         continue ;
37.                     }else if(len2>0){
38.                         if(len>7)*dst++=0xe0 | (len>>3) ;
39.                         *dst++=0x80 | (len&7)<<3 | (len2&7) ;
40.                         *dst++=data ;
41.                         memcpy(dst,src+x,(len2) ;
42.                         dst+=len2 ; x+=len2
43.                         continue ;
44.                     }
45.                 }
46.                 if(len>7)*dst++=0xe0 | (len>>3);
47.                 *dst++=0x00 | (len&7)<<3 | copy;
48.                 *dst++=data;
49.                 continue;
50.             }
51.             len=count_raw(src, x, width, 255) ;
52.             if(len>7)*dst++=0xe0 | (len>>3) ;
53.             *dst++=0x40 | (len&7)<<3 | copy ;
54.             memcpy(dst, src+x, len) ;
55.             dst+=len ; x+=len ;
56.         }
57.     }
58.     return dst-dsttop ;
59. }
```

FIG. 7

```
1.   int count_raw(unsigned char *src, int x, int y, int width, int limit)
2.   {
3.       int len;
4.
5.       for (len=0 ; x<width && len<limit ; x++, len++){
6.           if (len==0 && x+1<width && src[x+1])break ;
7.           if (x+2<width && src[x]==src[x+1] && src[x]==src[x+2])break ;
8.           if (y!=0 && src[x]==src[x-width]){
9.               if (len≦7)break ;
10.              if (x+1<width && src[x+1]==src[x+1-width])break ;
11.              if (x+2<width && src[x+1]==src[x+2])break ;
12.          }
13.      }
14.      return len ;
15.  }
16.
```

FIG. 8

ENCODING METHOD AND APPARATUS FOR COMPRESSING A DATA STRUCTURE HAVING TWO OR MORE DIMENSIONS, DECODING METHOD, AND STORAGE MEDIUM

FIELD OF THE INVENTION

The present invention relates to an encoding method for compressing a data structure having two or more dimensions, as in the case of image data, a decoding method for decoding the data that has been encoded, apparatus for executing these methods, and a computer-readable storage medium storing programs for executing these methods by computer.

BACKGROUND OF THE INVENTION

An example of a method of compressing image data available in the art is one which uses run-length encoding. If the same data repeats itself, run-length encoding is used to encode the repeating lengths and data. By writing software efficiently, encoding can be performed at a fairly high speed.

Another example of an available method is one which uses delta row coding. If one line of data is followed directly by an identical line of data, delta low coding encodes the length of the succeeding line.

Yet another method which can be used is Huffman coding. This method of encoding investigates the distribution of data and encodes data having a high frequency of occurrence into short codes.

However, with the method that relies upon run-length encoding, even if there is correlation in both the horizontal and vertical directions, as in the case of image data, only correlation in the horizontal direction contributes to compression. If there is correlation only in the vertical direction, there is no contribution to compression. As a consequence, it is difficult to achieve a high compression rate overall with this method.

Delta row coding is capable of performing encoding at high speed by use of software. However, even if there is correlation in both the horizontal and vertical directions, as in the case of image data, only correlation in the vertical direction contributes to compression. If there is correlation only in the horizontal direction, there is no contribution to compression and it is difficult to achieve a high compression rate.

With Huffman coding, even if there is correlation in both the horizontal and vertical directions, as in the case of image data, correlation in neither direction contributes to compression and, hence, it is difficult to achieve a high compression rate.

Various other encoding methods such as LZ77, LZ78 and JBIG encoding have been proposed. With these methods, however, it is necessary to investigate data other than data immediately to the left and data immediately above, where the horizontal and vertical correlations are most conspicuous. As a result, encoding requires a large amount of calculation. In a case where encoding is performed by software, the encoding takes considerable time. In instances where decoding is performed by hardware, a decoder of large scale is required.

Further, in a conventional printing system, the printer driver program of a host computer creates bitmap data, which allows the printer to perform printing, based upon a print instruction issued from an application program, encodes (compresses) the bitmap data by an encoding procedure of the kind described above, and outputs the encoded bitmap data, together with control data necessary for printing control, to the printer as print data. The printer, which does not have enough memory for one page, controls printing on the basis of the control data in the print data received from the host computer, decodes (expands) the encoded bitmap data and prints the results on printing paper.

The conventional printing system, which generates bitmap data in the host computer and transmits the bitmap data to the printer, is such that the host computer and the printer are connected by a local interface. Transfer time needed to transfer data from the host computer to the printer is fixed. As a result, even though the printer memory does not have enough capacity for one page, and even though print processing is executed starting from print data received previously, reception of print data that follows this page can be processed in time for ejection of the printing paper. This makes it possible to prevent overrun error.

With modern networks, one printer can be shared by a plurality of host computers. Accordingly, in a case where PDL (Page Description Language) is generated in a host computer and is expanded and printed by the printer, overrun error will not occur regardless of how long transfer time is in the network. However, if bitmap data is generated in the host computer and bitmap print data (which does not contain PDL) is subjected to print processing by the printer, print processing is started before reception of one page of print data ends. If data transfer takes too much time, therefore, there is the possibility that overrun error will occur. For this reason, a printer which relies upon data expansion by the host computer is not used by being connected directly to the network.

Accordingly, it has been contemplated to encode bitmap data in order to hold data transfer time below a fixed value. However, print instructions issued from an application are of a variety of types, and the encoding rate (decompression rate) differs depending upon the type of document, as in a case where a document contains much text or a case where a document contains many images. If a code expression suited to text is used, therefore, almost no compression can be performed in case of a document containing many images, a great deal of time is required to transfer the print data and overrun error occurs. Similarly, encoding suited to an image is not appropriate for a document containing a large quantity of text.

Accordingly, consideration has been given to having a printer driver support a plurality of code expressions, analyze the print instruction issued from the application and select the suitable code expression. If this is done, however, a plurality of code expressions must be supported. This means high cost in case of support by hardware and slow processing and reduced throughput in case of support by software. Further, when a print instruction issued from an application is analyzed one time, throughput declines by an amount approximately equivalent to a code representation of two passes.

An object of the present invention, therefore, is to provide a single-pass code expression suited to the encoding of bitmap data created by a host computer in a printing system in which a host computer and a printer communicate via a network.

SUMMARY OF THE INVENTION

The present invention has been proposed to solve the problems of the prior art and an object thereof is to provide an encoding method and apparatus, a decoding method and apparatus and a storage medium therefor, wherein a high compression rate is obtained by utilizing correlations in both the horizontal and vertical directions to encode a data structure having two or more dimensions, as in the case of image data, and wherein the amount of computation can be reduced by investigating only data immediately to the left and data immediately above, where the horizontal and vertical correlations are most conspicuous, thereby shortening the required encoding time when encoding is performed by software.

Another object of the present invention is to raise encoding efficiency by encoding at least two of three types of operations used when correlations in both the horizontal and vertical directions are utilized, namely repeating, copying and raw-data substitution operations, simultaneously (i.e., by encoding a combination of any two of these).

According to the present invention, the foregoing objects are attained by providing a decoding method and apparatus, an encoding method and apparatus and a storage medium for executing these methods by computer, the characterizing features of which are as described below.

Specifically, a decoding method according to the present invention comprises the steps of: determining, based upon a received code sequence, to which of repetition, copying and raw-data the code sequence applies; decoding the code sequence, in accordance with the determination, by a combination of at least two conversion operations from among repetition, copying and raw-data substitution; performing address management for storing each item of decoded data at a prescribed address; and outputting results of decoding in a predetermined address order in accordance with the address management.

In accordance with a preferred embodiment of the decoding method, the repetition is repetition of an identical data byte.

In accordance with a preferred embodiment of the decoding method, the copying is copying of data of an immediately preceding line.

In accordance with a preferred embodiment of the decoding method, the raw data is a direct designation of a data sequence of a given command code.

In accordance with a preferred embodiment of the decoding method, the received code sequence is related to image data of two or more dimensions correlated in horizontal and vertical directions.

Further, an encoding method according to the present invention comprises the steps of: determining, based upon a bit sequence of a given command code, to which of repetition, copying and raw-data substitution the bit sequence applies; calculating data lengths of each of repetition, copying and raw data based upon the determination; and, in accordance with the calculations, combining and encoding as a command of one byte at least two of results from among results of repetition, copying and raw-data substitution of the encoding.

In accordance with a preferred embodiment of the encoding method, the repetition is repetition of an identical data byte.

In accordance with a preferred embodiment of the encoding method, the copying is copying of data of an immediately preceding line.

In accordance with a preferred embodiment of the encoding method, the raw data is a direct designation of a data sequence of the given command code.

In accordance with a preferred embodiment of the encoding method, the given command code is related to image data of two or more dimensions correlated in horizontal and vertical directions.

Further, there is provided a computer-readable storage medium storing a program for decoding encoded image data of two or more dimensions correlated in horizontal and vertical directions, wherein the program comprises: code of a step of determining, based upon a received code sequence, to which of repetition, copying and raw-data substitution the code sequence applies; code of a step of decoding the code sequence, in accordance with the determination, by a combination of at least two conversion operations from among repetition, copying and raw-data substitution; code of a step of performing address management for storing each item of decoded data at a prescribed address; and code of a step of outputting results of decoding in a predetermined address order in accordance with the address management.

Further, there is provided a computer-readable storage medium storing a program for encoding image data of two or more dimensions correlated in horizontal and vertical directions, wherein the program comprises: code of a step of determining, based upon a bit sequence of a given command code, to which of repetition, copying and raw-data substitution the bit sequence applies; code of a step of calculating data lengths of each of repetition, copying and raw data based upon the determination; and, in accordance with the calculations, code of a step of combining and encoding as a command of one byte at least two results from among results of repetition, copying and raw-data substitution of the encoding.

Further, a decoding apparatus according to the present invention comprises: means for determining, based upon a received code sequence, to which of repetition, copying and raw-data substitution the code sequence applies; means for decoding the code sequence, in accordance with the determination, by a combination of at least two conversion operations from among repetition, copying and raw-data substitution; means for performing address management for storing each item of decoded data at a prescribed address; and means for outputting results of decoding in a predetermined address order in accordance with the address management.

In accordance with a preferred embodiment of the decoding apparatus, the repetition is repetition of an identical data byte.

In accordance with a preferred embodiment of the decoding apparatus, the copying is copying of data of an immediately preceding line.

In accordance with a preferred embodiment of the decoding apparatus, the raw data is a direct designation of a data sequence of a given command code.

In accordance with a preferred embodiment of the decoding apparatus, the received code sequence is related to image data of two or more dimensions correlated in horizontal and vertical directions.

Further, an encoding apparatus according to the present invention comprises: means for determining, based upon a bit sequence of a given command code, to which of repetition, copying and raw-data substitution the bit sequence applies; means for calculating data lengths of each of repetition, copying and raw data based upon the determination; and, in accordance with the calculations, means for combining and encoding as a command of one byte at least two results from among results of repetition, copying and raw-data substitution of the encoding.

In accordance with a preferred embodiment of the encoding apparatus, the repetition is repetition of an identical data byte.

In accordance with a preferred embodiment of the encoding apparatus, the copying is copying of data of an immediately preceding line.

In accordance with a preferred embodiment of the encoding apparatus, the raw data is a direct designation of a data sequence of the given command code.

In accordance with a preferred embodiment of the encoding apparatus, the given command code is related to image data of two or more dimensions correlated in horizontal and vertical directions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing the details of the encoding procedure of an encoding program;

DESCRIPTION OF THE PREFERRED EMBODIMENTS

Preferred embodiments of the present invention will now be described in detail in accordance with the accompanying drawings.

(First Embodiment)

Figure 1:
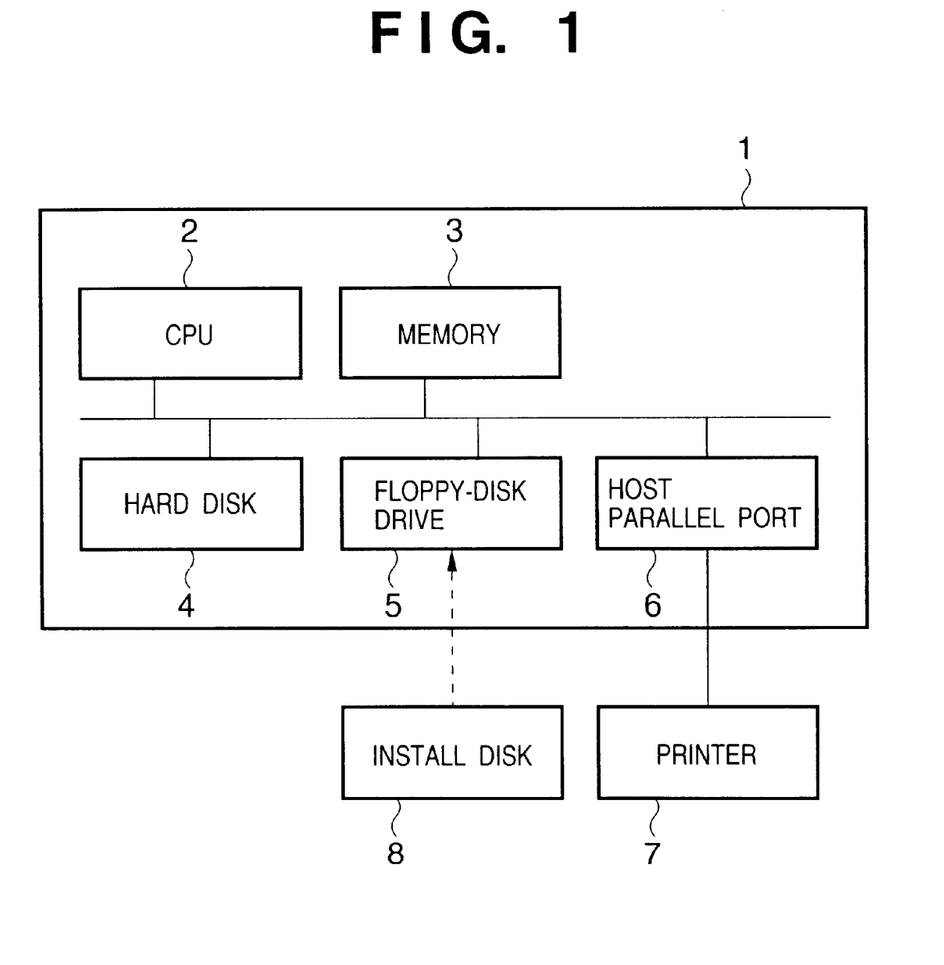
FIG. 1 is block diagram useful in describing the configuration of a printing system to which the encoding and decoding methods according to a first embodiment of the present invention are applicable.

FIG. 1 is a block diagram useful in describing the configuration of a printing system to which the encoding and decoding methods according to a first embodiment of the present invention are applicable.

As shown in FIG. 1, the system includes a host computer 1, which has a CPU 2, a memory 3, a hard disk 4, a floppy-disk drive 5 and a host parallel port 6, and a printer 7 to which the host computer 1 is connected via the host parallel port 6.

The CPU 2 executes various control programs and application programs that have been stored in the memory 3. The latter stores programs read out of the hard disk 4 or floppy-disk drive 5 and data necessary for these programs.

The hard disk 4 stores programs such as an operating system 10, application program (application) 11, printer driver program 12 and communication program 15, which will be described later.

The floppy-disk drive 5 makes it possible to insert a floppy disk such as an install disk 8 so that a program that has been stored on the inserted floppy disk can be read. The host parallel port 6 can send data to the printer 7. The latter receives data from the host parallel port 6 and prints out the data received.

The install disk 8 stores the printer driver program 12, shown in FIG. 2 described below, and an install program.

The usual install operation involves having the operator set the install disk 8 in the floppy-disk drive 5 (or in a CD-ROM drive, which is not shown) and launch the install program, whereupon the install program reads in the printer driver program 12 from the install disk 8 and writes the program to the hard disk 4.

Further, by using the functions provided by the printer driver program 12, the install program sets up the printer driver program 12 so that it can be used from the application 11.

Figure 2:
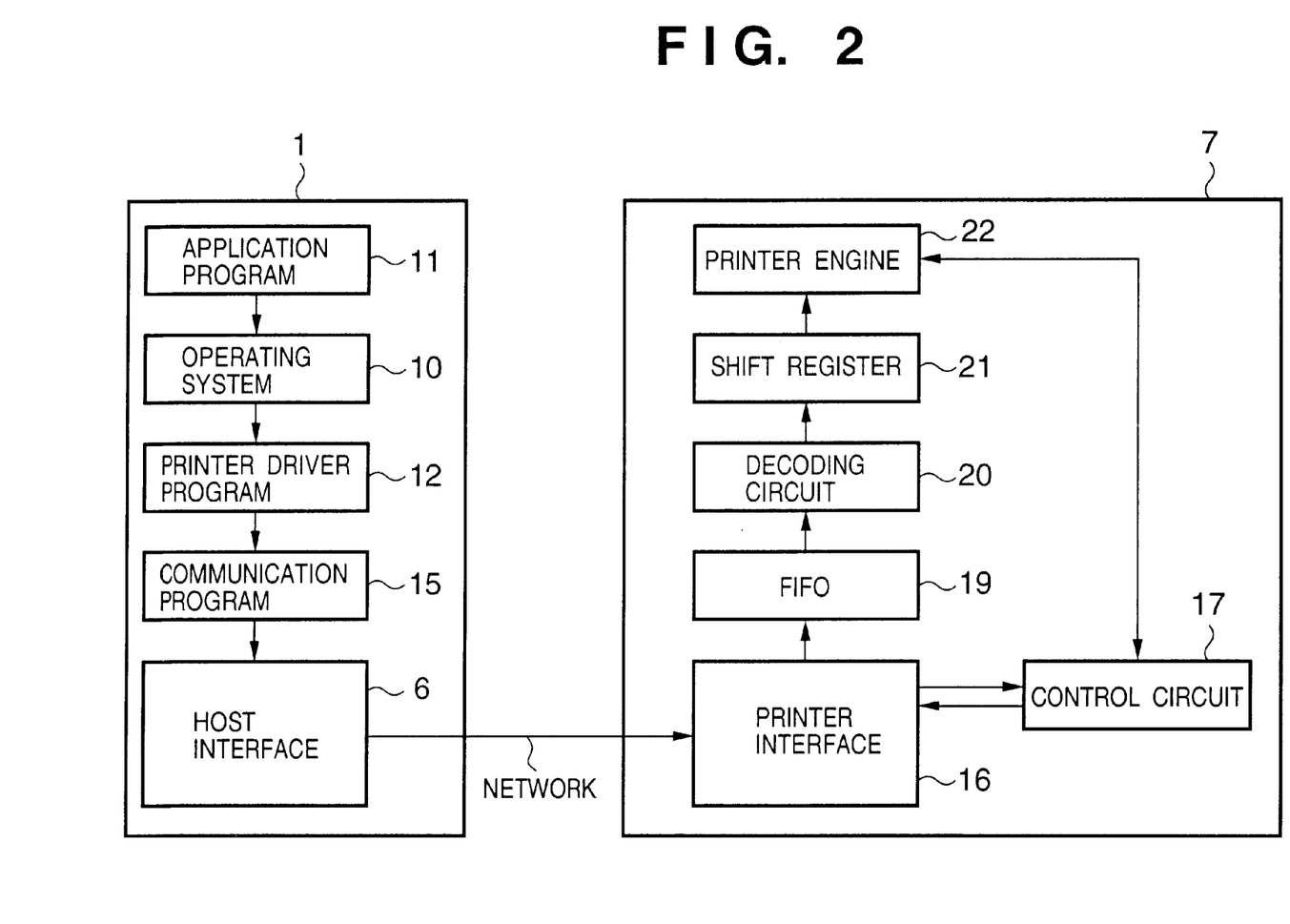
FIG. 2 is block diagram useful in describing the configuration of a printing system to which the encoding and decoding methods according to the first embodiment of the present invention are applicable.

FIG. 2 is a block diagram illustrating the configuration of the printing system to which the encoding and decoding methods of the present invention are applied.

The operating system 10 in FIG. 2 performs management of hardware resources such as the CPU 2, memory 3, hard disk 4, floppy-disk drive 5 and host parallel port 6, and management of software such as the application 11, printer driver program 12 and communication program 15.

The application 11 creates print data in accordance with a command from the operator and issues a print command to the printer driver program 12 via the operating system 10. On the basis of the print command issued from the application program 11, the printer driver program 12 creates bitmap data so that the printer 7 can perform printing, encodes the bitmap data through an encoding procedure described later, and outputs the encoded bitmap data together with such data necessary for printing control as paper size, the line length of the bitmap data and the number of lines, etc. The communication program 15 controls the host interface 6 through the network to transmit data to the printer 7.

The host interface 6 is connected to the printer interface 16 via a LAN (Local-Area Network). The printer interface 16, which functions to connect the printer to the network, corresponds to a network port, by way of example.

A control circuit 17, which is constituted by, e.g., a one-chip CPU, controls the printer I/F 16, a FIFO (first-in first-out) memory 19, a decoding circuit 20, a shift register 21 and a printer engine 22.

The FIFO memory 19 stores data received from the printer I/F 16 and outputs the stored data to the decoding circuit 20 in first-in first-out fashion. The decoding circuit 20 decodes code-sequence data that has been stored in the FIFO memory 19 and outputs the decoded data to the shift register 21.

The shift register 21 converts the parallel data from the decoding circuit 20 to serial data and outputs the serial data to the printer engine 22.

The printer engine 22, which is a laser printer engine, uses a serial signal to receive an engine command from and transmit engine status to the control circuit 17. Upon receiving a PRINT command from the control circuit 17, the printer engine 22 starts the print processing of one page and, when printing paper reaches a predetermined position, performs printing in accordance with the serial data that has been output from the shift register 21.

The printing operation will now be described.

The operator causes the generation of print data by operating the application program 11 on the side of the host computer 1. When a command to print this data is issued, the print command is delivered from the application program 11 to the printer driver program 12 via the operating system 10. The printer driver program 12 creates bitmap data based upon the print command issued from the application program 11.

On the basis of an encoding procedure described later, the printer driver program 12 generates encoded data from the bitmap data that has been created and outputs this encoded data together with such data necessary for printing control as paper size, the line length of the bitmap data and the number of lines, etc.

The communication program 15 transmits the data necessary for printing control and the encoded data, which has been created by the printer driver program 12, via the host I/F 6.

The control circuit 17 receives the above-mentioned data via the printer I/F 16. If a received command is a command "0×01" specifying the start of printing, the control circuit 17 transmits the PRINT command to the printer engine 22. The latter starts printing upon receiving the PRINT command.

On the basis of a decoding procedure described later, the decoding circuit 20 decodes the encoded data that has been stored in the FIFO memory 19 and outputs the decoded data to the shift register 21.

The shift register 21 has a counter for counting the length of the main scan. Whenever the start of the main scan is reported by the printer engine 22, a predetermined value is set in the counter. Thereafter, as long as the value in the counter is larger than zero, parallel data output by the decoding circuit 20 at a predetermined timing is converted to serial data, the serial data is output to the printer engine 22 and the counter is counted down. When the printing paper arrives at a predetermined position, the printer engine 22 reports that output of data is necessary whenever main scan starts and performs printing based upon the serial data that has been output by the shift register 21.

Figure 3:
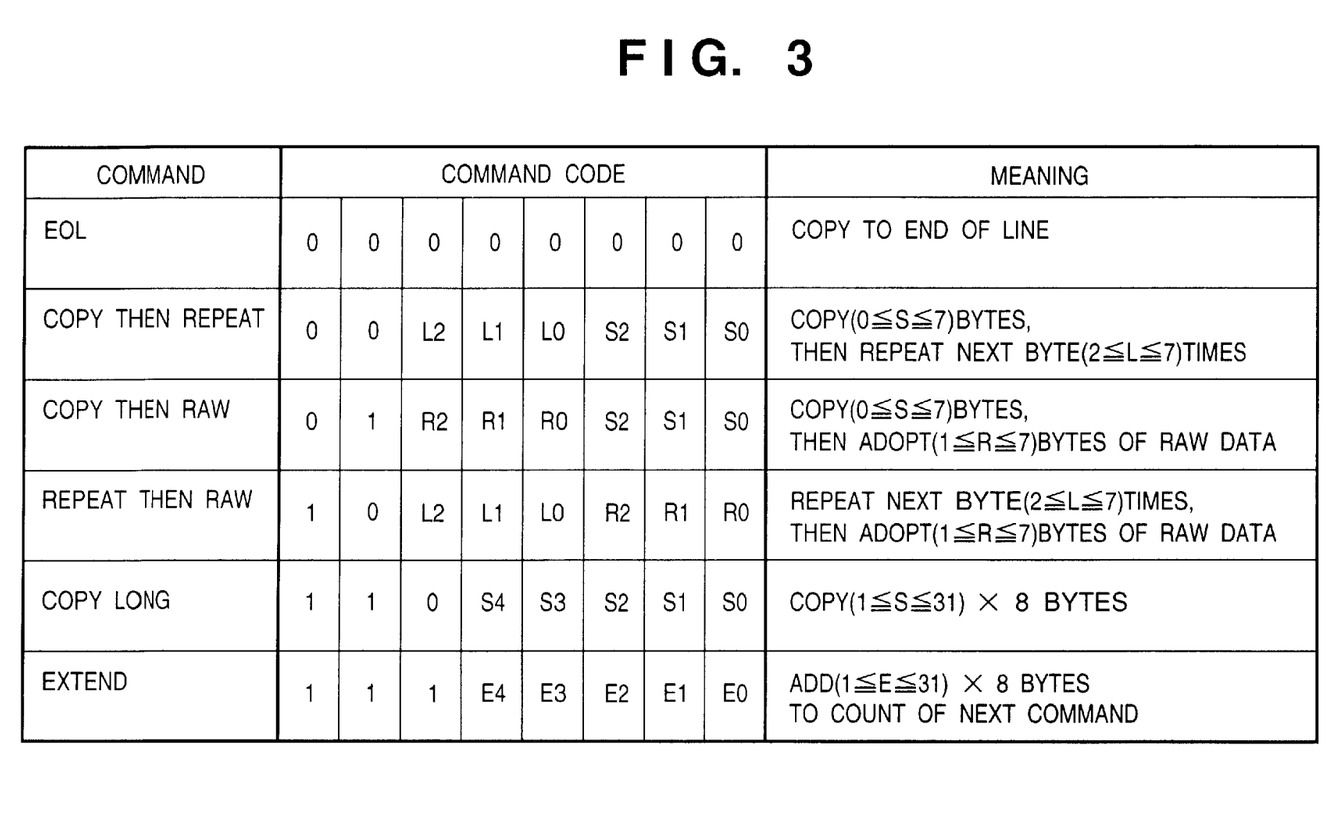
FIG. 3 is a diagram illustrating an example of an encoding table for generating an encoding program.
Figure 4:
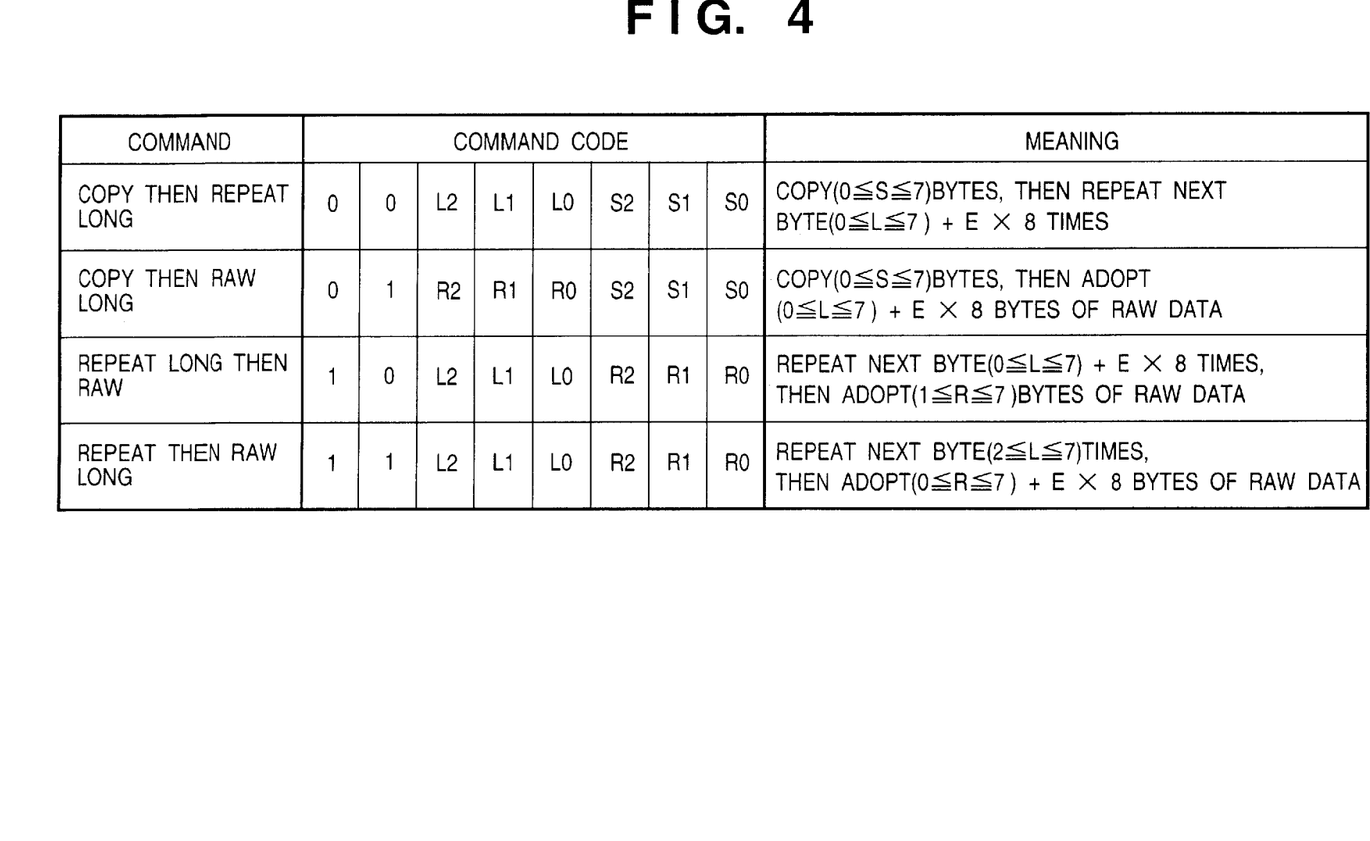
FIG. 4 is a diagram illustrating an example of an encoding table for generating an encoding program.

Reference will now be had to FIGS. 3 and 4 to describe code generated by the printer driver program 12 shown in FIG. 2.

FIG. 3 is a diagram illustrating an example of an encoding table generated by the printer driver program 12 shown in FIG. 2. The code described in this embodiment specifies at least one of three types of operations, namely repeat, which indicates repetition of the same data byte, copy, which copies the data of the immediately preceding line, and raw data, which directly specifies a data sequence.

In a case where the bits of a command code are "00000000", as shown in FIG. 3, this command is an EOL command which indicates the copying of the immediately preceding line up to the end of the line.

If the two high-order bits of the command code are "00" and any of the remaining bits is not "0", such a command is a "Copy then Repeat" command. This command indicates the following: S bytes, which is specified by the three low-order bits, of the data of the immediately preceding line are copied, after which one byte of repeating data that immediately follows the command code is repeated L times, which is specified by the three mid-order bits.

If the two high-order bits of the command code are "01", such a command is a "Copy then Raw" command. This command indicates the following: S bytes, which is specified by the three low-order bits, of the data of the immediately preceding line are copied, after which R bytes, specified by the three mid-order bits, that immediately follow the command code are adopted as data as is.

If the two high-order bits of the command code are "10", such a command is a "Repeat then Raw" command. This command indicates the following: One byte of repeating data that immediately follows the command code is repeated L times specified by the three mid-order bits, after which R bytes, specified by the three low-order bits, that immediately follow the repeating data are adopted as data as is.

If the three high-order bits of the command code are "110", such a command is a "Copy Long" command. This command indicates the following: 8×S bytes, specified by the five low-order bits, of the data of the immediately preceding line are copied.

If the three high-order bits of the command code are "111", such a command is an "Extend" command. This is one command obtained by combining the command code with a second command code that follows it. It indicates the following: a count that is eight times E, which is specified by the five low-order bits, is added to the count indicated by the second command code.

FIG. 4 is a diagram illustrating an example of second command codes that follow the Extend command shown in FIG. 3.

If the two high-order bits of the second command code are "00", as shown in FIG. 4, such a command is a "Copy then Repeat Long" command. This command indicates the following: S bytes, which is specified by the three low-order bits, of the data of the immediately preceding line are copied, after which one byte of repeating data that immediately follows the second command code is repeated a number of times obtained by adding 8×E, which is specified by the Extend command, to L specified by the three mid-order bits.

If the two high-order bits of the second command code are "01", such a command is a "Copy then Raw Long" command. This command indicates the following: S bytes, which is specified by the three low-order bits, of the data of the immediately preceding line are copied, after which data of a number of bytes, which immediately follows the second command code, obtained by adding 8×E, which is specified by the Extend command, to R specified by the three mid-order bits, is adopted as data as is.

If the two high-order bits of the second command code are "10", such a command is a "Repeat Long then Raw" command. This command indicates the following: One byte of repeating data that immediately follows the second command code is repeated a number of times obtained by adding 8×E, which is specified by the Extend command, to L specified by the three mid-order bits, after which R bytes, specified by the three low-order bits, that immediately follow the repeating data are adopted as data as is.

If the two high-order bits of the second command code are "11", such a command is a "Repeat then Raw Long" command. This command indicates the following: One byte of repeating data that immediately follows the second command code is repeated L times specified by the three mid-order bits, after which data of a number of bytes, which immediately follows the repeating data, obtained by adding 8×E, which is specified by the Extend command, to R specified by the three mid-order bits, is adopted as data as is.

An embodiment of code illustrated in FIGS. 3 and 4 will now be described with reference to FIG. 5.

Figure 5:
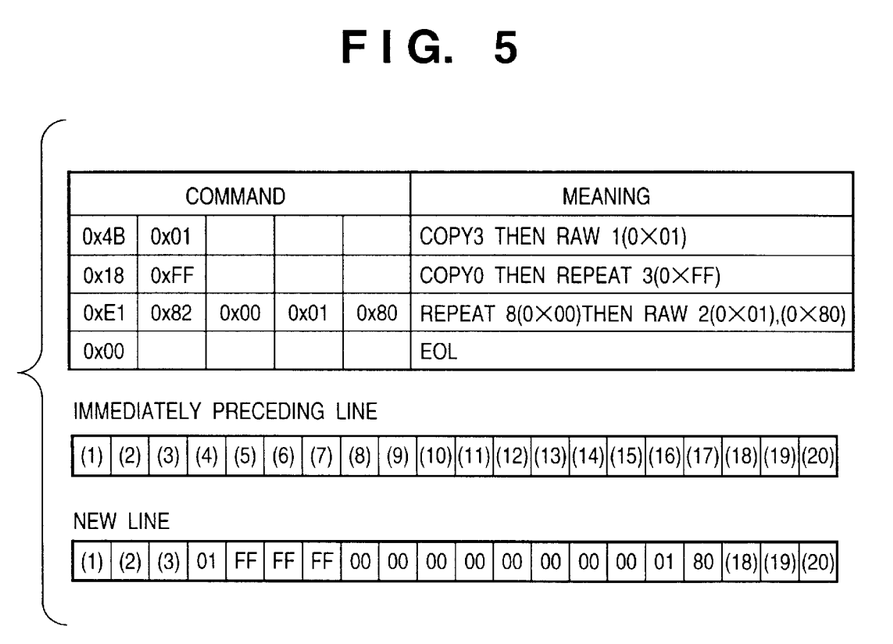
FIG. 5 is a diagram illustrating a specific example of code shown in FIGS. 3 and 4.

In FIG. 5, "0×4B, 0×01, 0×18, 0×FF, 0×E1, 0×82, 0×00, 0×01, 0×80, 0×00" indicate part of a code string and express one line. The length of the line is 20 bytes and the immediately preceding line is "(1), (2), (3), . . . , (20)", as illustrated.

On the assumption that the illustrated code is applied, the leading command "0×4B" is a bit sequence "01001011" and therefore this is the Copy then Raw command. The number S of copies is 3 and the raw-data size R is 1. Accordingly, the three bytes of data "(1), (2), (3)" are copied from the immediately preceding line, after which the one byte of data "0x01" that follows the command code is adopted as data as is.

The next command "0x18" is a bit sequence "00011000" and therefore this is the Copy then Repeat command. The number S of copies is 0 and the number L of repetitions is 3. Accordingly, the repeating data "0xFF" that follows the command code is repeated three times.

The next command "0xE1" is a bit sequence "11100001" and therefore this is the Extend command, in which E is 1. The second command code "0x82" is a bit sequence "10000010" and therefore this is the Repeat Long then Raw command, in which L is 0. Accordingly, the number "L+8× E" of repetitions is 8 and the raw-data size R is 2. The repeating data "0x00" that follows the second command code, therefore, is repeated eight times, after which the two bytes of data "0x01, 0x80" that follow the repeating data are adopted as data as is.

The next command "0x00" is a bit sequence "00000000" and therefore this is the EOL command. Accordingly, the three bytes "(18), (19), (20)" up to the end of the line are copied from the immediately preceding line.

Described next will be the effects obtained by encoding a plurality of operations simultaneously (i.e., by encoding a combination of a plurality of operations). In a case where encoding is performed using the three operations of copying, repeating and raw data, a 1-byte command must be adopted for each of copying, repeating and raw data unless the plurality of operations are encoded simultaneously. If copying and repeating, copying and raw data or repeating and raw data are encoded simultaneously, two operations can be made a 1-byte command, thereby raising the compression rate.

By encoding a plurality of operations simultaneously, however, the length that can be expressed by a 1-byte command shortens. For example, if a 1-byte command is adopted for each of copying, repeating and raw data, six bits can be used to express length and a length up to 63 can be expressed on the assumption that two bits are used to distinguish the particular operation. If a plurality of operations are encoded simultaneously, only three bits can be used to express length and a length of up to only 7 can be expressed in the above-mentioned example.

In a bitmap printed by a printer, there is similarity to the immediately preceding line but lines generally differ little by little. Often, therefore, there are a great many combinations of copying of short lengths and repeating of long lengths or combinations of copying of short lengths and raw data of short lengths. This tendency is conspicuous especially in the printing of text, i.e., character fonts. For this reason, often it is better to limit length and encode a plurality of operations simultaneously in order to raise the compression rate.

The effects of the EOL command will be described next. Since the EOL command is for performing copying up to the end of the line, it can be replaced with a copy command of a certain length.

A bitmap printed by a printer generally has a blank space of a certain size on its right side. If the length of the blank space on the right side is 2.54 cm and the printer is a 600-dpi laser printer, the blank space will consist of 600 dots, which is equivalent to 75 bytes. In order to express copying of length 75, a Copy Long command of length 72 and a Copy command of length 3 not defined in FIG. 3 will be necessary, giving two bytes. Since the EOL command does not include length, expression by one byte is possible. As a result, the compression rate of code is improved and a Copy command of length 1 to 7 is unnecessary.

The details of the encoding procedure of printer driver program 12 will be described with reference to program lists shown in FIGS. 6 and 7.

FIG. 6 is a diagram useful in describing the details of the encoding procedure of printer driver program 12 shown in FIG. 2. By way of example, the program is constructed of functions described in C language.

Line 1 in FIG. 6 defines the function name, argument and type of return value. The function name of this function is "encode". The function receives, from the calling source, the starting address "src" of the bitmap data, starting address "dst" of a buffer which stores the encoded data, byte count "width" of one line and line count "height", encodes the bitmap data, stores the encoded data in the buffer and sends back the byte count, which has been stored in the buffer, as the return value.

In the course of the encoding processing, the starting addresses "src" and "dst" are updated so as to indicate the starting address of an unprocessed line of the bitmap data and the starting address of a buffer at which processing has not yet been executed.

Lines 3 and 4 define temporary variables "x, y, len, len2, copy, copy2, limit, data, dsttop", where x stores the offset from the beginning of the line currently being processed in the bitmap data, y stores the line number of the line currently being processed, "len" and "len2" store the length of raw data currently being processed or the length of repetition, "copy" and "copy2" store the number of repetitions currently being processed, "limit" stores the upper limit of the raw-data length, "data" stores the repeating data and "dsttop" stores the starting address "dst" of the buffer which stores the encoded data when the function "encode" has been called.

When the function "encode" is called, the value of the leading address "dst" of the buffer is stored in "dsttop" at line 4.

Next, in a first "for" loop of lines 5 to 57, y is initialized to 0 and the loop is repeated until y becomes equal to "height". At the end of each loop, 1 is added to y and "width", i.e., the length of one line, is added to "src".

In the first "for" loop, a second "for" loop from line 6 to line 56 is executed. In the second "for" loop, x is initialized to 0 and the loop is repeated until x becomes equal to "width".

In the second "for" loop, first 0 is set for "copy" at line 7. Next, it is determined at line 8 whether y is 0. If y is 0, then this is the starting line and the program proceeds to line 24. If y is not 0, then, in order to make a comparison with the data of the immediately preceding line, first a "while" loop of lines 9 to 11 is executed. In the "while" loop, 1 is added to x and to "copy" at line 10 while x is less than "width" and "src[x]", namely the xth byte of the present line (i.e., the present byte), and "src[x-width]", namely the xth byte of the immediately preceding line (i.e., the byte directly above the present byte), are equal. At the moment the "while" loop is exited, a length over which data continuously matches that of the immediately preceding line, namely the copy count, is stored in "copy" and x is updated in accordance with this length. Next, at line 12, it is determined whether x is equal to "width". If x and "width" are equal, then the data matches that of the immediately preceding line continuously to the end of the line and encoding to the EOL command can be performed. At line 13, therefore, 0x00, namely the EOL command, is stored in the output buffer and "dst" is updated. The second "for" loop is ended by "break" on line 14.

If x and "width" are not equal, a "while" loop of lines 16 to 20 is executed. In this "while" loop, the processing of lines 17 to 19 is repeated while "copy" is greater than 7. First, copy/8 or 31, whichever is smaller, is stored in "copy2" at line 17. Here "min" is a macro that returns whichever of the two arguments is smaller. Next, at line 18, the Copy Long command is stored in the output buffer and "dst" is updated. Next, at line 19, the copy count conforming to the Copy Long command output at line 18 is subtracted from "copy". Thus, the Copy Long command is output and, at the moment the "while" loop is exited, "copy" is equal to or less than 7.

Next, at line 22, it is determined whether the byte following the present byte remains on the present line and whether "src[x]", namely the present byte, and "src[x+1]", namely the following byte, match. If the byte following the present byte does not remain on the present line, or if the present byte and the following byte do not match, then this is a case in which there is no repetition and, hence, the program proceeds to line 51. If the byte following the present byte remains on the present line and if "src[x]", namely the present byte, and "src[x+1]", namely the following byte, match, then the number of repetitions is sought. First, at line 23, "src[x]", namely the repeating data, is stored in "data". Next, a "for" loop is executed from line 24 to line 26. In the "for" loop, 2 is added to x and 2 is stored in "len" as initialization processing in order to skip two items of matching data, and the loop is executed while x is less than "width" and "len" is less than 255. At the end of each loop, 1 is added to x and to "len". If "src[x]", namely the present data, is not equal to "data", namely the repeating data, in the loop, this "for" loop is ended by "break" on line 25. Thus, at the moment the loop is exited, the number of items of successive repeating data is stored in "len" and x is updated in accordance with the value of "len".

Next, whether "copy" is 0 is determined at line 27. If "copy" is not 0, the program proceeds to line 46 because there is no possibility that encoding to the Repeat then Raw command can be performed. If "copy" is 0, then, at line 28, 7 is stored in limit if "len" is greater than 7 and 255 is stored in limit if "len" is not greater than 7. Next, at line 29, a function "count_raw", described later, is called, whereby the length that should be stored as raw data is stored in "len2". This is followed by line 30, at which it is determined whether "len2" is greater than 7. If "len2" is not greater than 7, this is not a case in which encoding to the Repeat then Raw Long command should be performed and, hence, the program proceeds to line 37. If "len2" is greater than 7, the Extend command is stored in the output buffer to update "dst" on line 31, the Repeat then Raw Long command is stored in the output buffer to update "dst" on line 32, "data", namely the repeating data, is stored in the output buffer to update "dst" on line 33, the raw data is copied to the output buffer by a library function "memcpy" on line 34, x and "dst" are updated on line 35 in accordance with the length of raw data copied at line 34, and the second "for" loop is returned to at "continue" on line 36.

If it is found at line 30 that "len2" is not greater than 7, it is determined whether "len2" is greater than 0 at line 37. If "len2" is 0, this is not a case in which encoding to the Repeat then Raw command should be performed and, hence, the program proceeds to line 46. If, in a case where "len2" is greater than 0, "len" is found to be greater than 7, the Extend command is stored in the output buffer to update "dst" on line 38, the Repeat then Raw command is stored in the output buffer to update "dst" on line 39, "data", namely the repeating data, is stored in the output buffer to update "dst" on line 40, the raw data is copied to the output buffer by the library function "memcpy" on line 41, and the second "for" loop is returned to at "continue" on line 42.

If "len" is found to be greater than 7 at line 46 in a case where "copy" is not 0 at line 27 and in a case where "len2" is 0 at line 31, the Extend command is stored in the output buffer to update "dst" on line 46, the Copy then Repeat command is stored in the output buffer to update "dst" on line 47, "data", namely the repeating data, is stored in the output buffer to update "dst" on line 48, and the second "for" loop is returned to at "continue" on line 49.

In a case where the byte that follows the present byte does not remain on the present line, or in a case where the present byte and the following byte do not match, the function "count_raw", described later, is called, whereby the length that should be stored as raw data is stored in "len". If "len" is greater than 7, the Extend command is stored in the output buffer to update "dst" on line 52, the Copy then Raw command is stored in the output buffer to update "dst" on line 53, the raw data is copied to the output buffer by the library function "memcpy" on line 54, x and "dst" are updated on line 55 in accordance with the length of raw data copied at line 54, and a return to the second "for" loop is effected.

When the present line is thus processed in full and x becomes equal to "width", the second "for" loop is exited and a return to the first "for" loop is effected. At the conclusion of each loop, 1 is added to y and "width", namely the length of one line, is added to "src". The processing of the next line begins as a result. When the processing of all lines is thus completed and h becomes equal to "height", the first "for" loop is exited and, at line 58, "dsstop", namely the starting address of the buffer, is subtracted from "dst", namely the end address of the buffer, whereby the number of bytes that has been stored in the buffer is obtained. This is adopted as the return value and the function is terminated.

The details of the processing procedure regarding the function "count-raw" will now be described with reference to the program list shown in FIG. 7.

Figure 7:
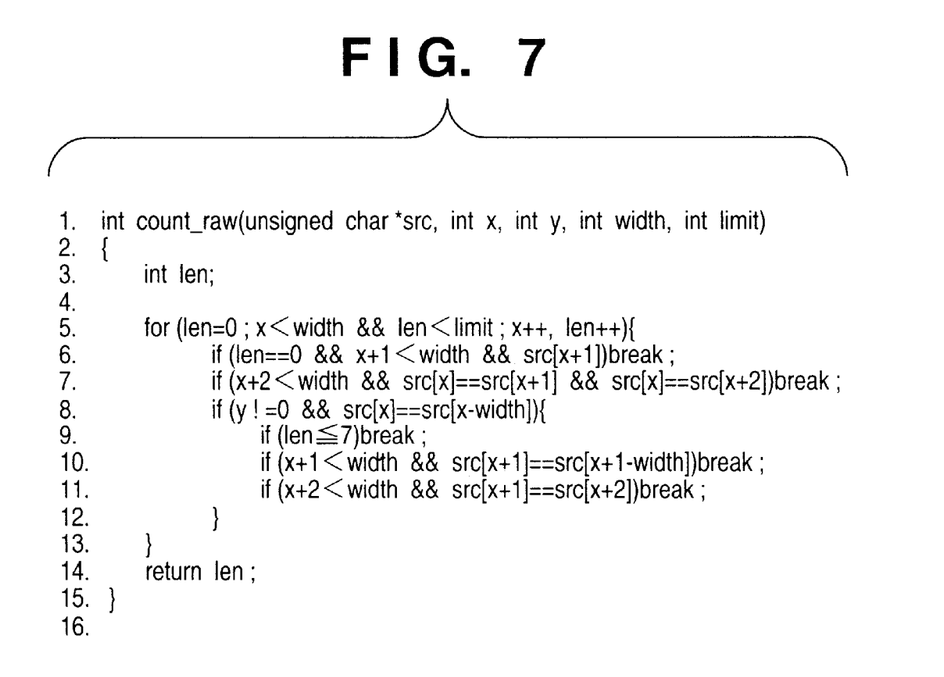
FIG. 7 is a diagram showing the details of the encoding procedure of an encoding program.

FIG. 7 is a diagram useful in describing the details of the function "count_raw" shown in FIG. 2. By way of example, the program is constructed of functions described in C language.

Line 1 in FIG. 7 defines the function name, argument and type of return value. The function name of this function is "count_raw". The function receives, from the calling source, the starting address "src" of the present line of the bitmap data, the offset x of the present position from the beginning of the line, the line number y, the byte count "width" of one line and the upper limit "limit" of the length of raw data, and sends back, as the return value, the length that should be stored as raw data.

In the course of processing, the offset x of the present position from the beginning of the line is updated so as to indicate the present position. However, since the argument is not delivered as a value owing to the rules of C language, the updated value is not reflected in the argument of the calling source.

Line 3 defines the temporarily variable "len". Here "len" stores the length that should be stored as raw data.

If the function "count_raw" is called, then, in the "for" loop from lines 5 to 13, "len" is initialized to 0 and the loop is repeated while x is less than "width" and "len" is less than "limit". At the end of conclusion of each loop, 1 is added to x and to "len".

If, at line 6 in the loop, "len" is 0, i.e., this is the beginning of the raw data, the data that follows the present data remains on the present line and the present data and following data are equal, then the number of repetitions is equal to or greater than 2 at the beginning of the data and this should be encoded as repetition. The "for" loop is exited, therefore, by "break".

If the data that follows the present data remains on the present line and the present data, following data and the data following this data are all equal at line 7, then the number of repetitions is equal to or greater than 3 and this should be encoded as repetition data. The "for" loop is exited, therefore, by "break".

Next, at line 8, if y is not 0, i.e., if this is not the beginning line, and the present data and data directly above it are equal, then lines 9 to 11 are executed. First, at line 9, if "len" is equal to or less than 7, this is encoded as copying, whereby the length of the raw data exceeds 7 and the Extend command becomes necessary. As a result, the code can be prevented from lengthening needlessly by one byte. The "for" loop is exited, therefore, by "break".

Next, at line 10, if the following data remains on the present line and the following data and data directly above it are equal, then the number of copies is equal to or greater than 2 and this should be encoded as copying. The "for" loop is exited, therefore, by "break". Next, at line 11, if the data that follows the following data remains on the present line and the following data and the data that follows it are equal, then the number of copies is 1 and the number of repetitions is equal to or greater than 2. Since this should be encoded as copying +repetition, the "for" loop is exited by "break".

In a case where requirements for exiting the "for" loop are not met, the "for" loop is returned to, 1 is added to x and to "len" and the loop is continued. Thus, the loop is continued until data that should not be encoded to raw data is encountered, or until one line of data is processed in full, or until the upper limit "limit" of the raw-data length is reached. At the moment the loop is exited, the length that should be encoded as raw data will have been stored in "len" and therefore the value of "len" is adopted as the return value and the function is exited at line 14.

Next, the details of the decoding circuit 20 shown in FIG. 2 will be described with reference to FIG. 8.

Figure 8:
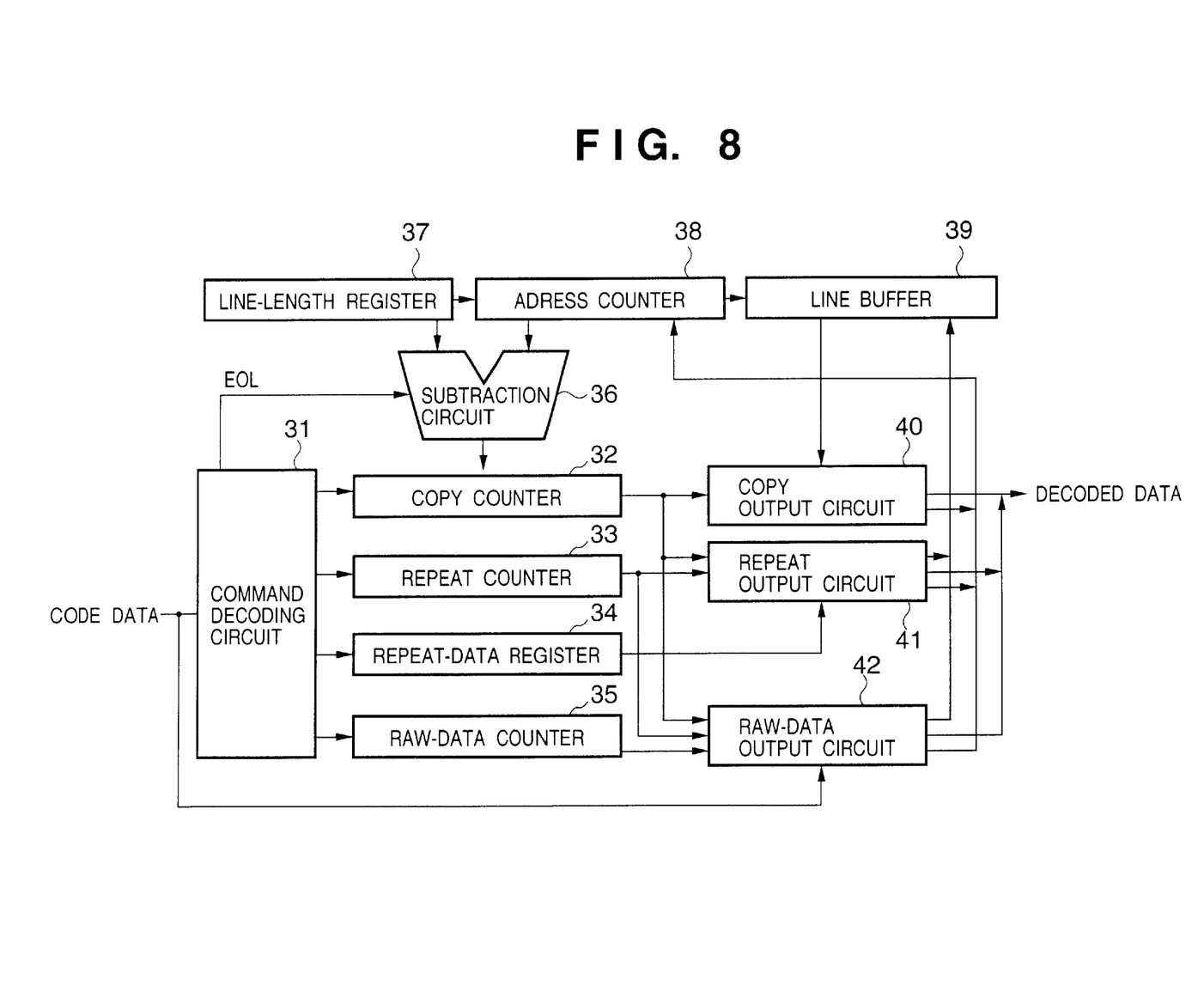
FIG. 8 illustrates the details of a decoding circuit.

FIG. 8 is a block diagram showing the details of the decoding circuit 20 depicted in FIG. 2.

If the counts in a copy counter 32, repeat counter 33 and raw-data counter 35 are all 0, a command decoding circuit 31 in FIG. 8 accepts encoded data, which is composed of the code shown in FIGS. 3 and 4, from the FIFO memory 19 (FIG. 2), decodes the encoded data and outputs the number of copies, the number of repetitions and the number of items of raw data to the copy counter 32, repeat counter 33 and raw-data counter 35, respectively. If a decoded command includes a repeat operation, the command decoding circuit 31 accepts the repeating data from the FIFO memory 19 and sets it in a repeat-data register 34. If the command decoding circuit 31 has encoded the EOL command, it outputs an EOL signal to a subtraction circuit 36 instead of outputting number of copies to the copy counter 32. In a case where the command decoding circuit 31 has decoded the Extend command, the command decoding circuit 31 retains internally the value that should be added to the count of the next command and then accepts the next command from the FIFO memory 19 and decodes it.

The copy counter 32 holds the number of copies output from the command decoding circuit 31 or subtraction circuit 36, the repeat counter 33 holds the number of repetitions output by the command decoding circuit 31, the repeat-data register 34 holds the number of repetitions output by the command decoding circuit 31 and the raw-data counter 35 holds the number of items of raw data output by the command decoding counter 31. When the command decoding circuit 31 has output the EOL signal, the subtraction circuit 36 calculates the difference between the content of a line-length register 37 and the content of an address counter 38 and outputs the difference to the copy counter 32. The line-length register 37 holds the number of bytes of one line output by the control circuit 17 in advance.

The address counter 38 holds the present address of a line buffer 39, and a copy output circuit 40, a repeat output circuit 41 or a raw-data output circuit 42 is counted up whenever the line buffer is accessed. As a result, if the number of bytes of one line held by the line-length register 37 is reached, the value is restored to 0. The line buffer 39 holds decoded data of at least one line and inputs or outputs decoded data in accordance with the present address held by the address counter 38.

In a case where the value held by the copy counter 32 is not 0, the copy output circuit 40 outputs, as decoded data, data of the immediately preceding line indicated by the address counter 38 and held by the line buffer 39, and subtracts 1 from the content of the copy counter 32 whenever one byte is output.

In a case where the value held by the copy counter 32 is 0 and the value held by the repeat counter 33 is not 0, the repeat output circuit 41 outputs, as decoded data, repeating data held by the repeat-data register 34, stores the output decoded data at a location in the line buffer 39 that is indicated by the address counter 38 and subtracts 1 from the content of the repeat counter 33 whenever one byte is output.

In a case where the value held by the copy counter 32 and the value held by the repeat counter 33 are both 0 and the value held by the repeat-data register 34 is not 0, the raw-data output circuit 42 outputs, as decoded data, data that has been stored in the FIFO memory 19, stores the output decoded data at a location in the line buffer 39 that is indicated by the address counter 38 and subtracts 1 from the content of the repeat-data register 34 whenever one byte is output.

If the command decoding circuit 31 decodes the Copy Long command, the number of copies is set in the copy counter 32 and 0 is set in the repeat counter 33 and raw-data counter 35. When the number of copies is set in the copy counter 32, the copy output circuit 40 reads data at the location of the line buffer 39 indicated by the address counter 38 and outputs this data as decoded data. Further, 1 is added to the address counter 38 and 1 is subtracted from the copy counter 32. This operation is repeated until the content of the copy counter 32 becomes 0, whereupon the command decoding circuit 31 decodes the next command.

If the command decoding circuit 31 decodes the EOL command, 0 is set in the repeat counter 33 and raw-data counter 35. Further, the command decoding circuit 31 outputs the EOL signal and the subtraction circuit 36 calculates the difference between the content of the line-length register 37 and the content of the address counter 38 and sets the difference in the copy counter 32. When the number of copies is set in the copy counter 32, processing is executed from this point onward in a manner similar to that of the Copy Long command.

If the command decoding circuit 31 decodes the Copy then Repeat command or the Copy then Repeat Long command, the number of copies is set in the copy counter 32, the number of repetitions is set in the repeat counter 33, the repeating data is set in the repeat-data register 34 and 0 is set in the raw-data counter 35. When the number of copies is set in the copy counter 32, first processing is executed in a manner similar to that of the Copy Long command and the content of copy counter 32 eventually becomes 0. Next, since the number of repetitions has been set in the raw-data counter 35, the repeat output circuit 41 outputs, as decoded data, the repeating data that has been stored in the repeat-data register 34 and writes this data to the line buffer 39 at a location thereof indicated by the address counter 38. Further, 1 is added to the content of the address counter 38 and 1 is subtracted from the repeat counter 33. This operation is repeated until the content of repeat counter 33 becomes 0, whereupon the command decoding circuit 31 decodes the next code.

If the command decoding circuit 31 decodes the Copy then Raw command or the Copy then Raw Long command, the number of copies is set in the copy counter 32, the number of copies is set in the copy counter 32, 0 is set in the repeat counter 33 and the number of items of raw data is set in the raw-data counter 35. When the number of copies is set in the copy counter 32, first processing is executed in a manner similar to that of the Copy Long command and the content of copy counter 32 eventually becomes 0. Next, since the number of items of raw data has been set in the raw-data counter 35, the raw data output circuit 42 outputs, as decoded data, raw data that has been stored in the FIFO memory 19 and writes this data to the line buffer 39 at a location thereof indicated by the address counter 38. Further, 1 is added to the content of the address counter 38 and 1 is subtracted from the raw-data counter 35. This operation is repeated until the content of raw-data counter 35 becomes 0, whereupon the command decoding circuit 31 decodes the next code.

If the command decoding circuit 31 decodes the Repeat then Raw command, Repeat Long then Raw command or Repeat then Raw Long command, 0 is set in the copy counter 32, the number of repetitions is set in the repeat counter 33, the repeating data is set in the repeat-data register 34 and the number of items of raw data is set in the raw-data counter 35. If the number of repetitions is set in the repeat counter 33, processing is executed in a manner similar to that of the Copy then Repeat command and the content of repeat counter 33 eventually becomes 0. Next, since the number of items of raw data has been set in the raw-data counter 35, raw data is output in a manner similar to that of the Copy then Raw command and the content of the raw-data counter 35 eventually becomes 0.

(Second Embodiment)

According to the first embodiment, the decoding circuit 20 is implemented by hardware. However, an arrangement may be adopted in which decoding can be performed by software instead.

Further, in the first embodiment, there is code that is not used. For example, in the case of the Copy Long command, the number 0 of repetitions is not used and, hence, the bit sequence "11000000" is unused. Instead of this, however, an arrangement may be adopted in which another command is assigned to this code or the command is defined in such a manner that a length of from 1 to 32 is expressed by a number of from 0 to 31.

Further, in the first embodiment, the Repeat then Raw command is defined. Rather than defining this command, however, it is permissible to define another command such as the Copy Long command or Extend command so as to increase the range of command length.

Further, in the first embodiment, processing is delimited at line end in regard to encoding. Rather than delimiting processing at line end, however, it is permissible to execute processing by assuming that rightmost data of a certain line is followed by leftmost data of the next line.

(Other Embodiments)

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

In a case where the present invention is applied to the above-mentioned storage medium, program code (shown in FIG. 6 or 7) described earlier would be stored on the recording medium.

Thus, in accordance with the present invention, as described above, when encoding is performed, reference is had to data immediately to the left and data immediately above. As a result, data having correlation in both the horizontal and vertical directions, as in the case of image data, can be encoded at a high compression rate. In addition, since no reference is made to data other than data immediately to the left and data immediately above, the amount of calculation involved in encoding is small and encoding can be performed at high speed even in a case where the encoding is implemented by software.

Further, in accordance with the present invention, a plurality of operations are encoded simultaneously or decoded simultaneously, thus making it possible to encode image data at a high compression rate.

As many apparently widely different embodiments of the present invention can be made without departing from the spirit and scope thereof, it is to be understood that the invention is not limited to the specific embodiments thereof except as defined in the appended claims.

What is claimed is:

1. A decoding method comprising the steps of:
   receiving an encoded code sequence and analyzing an encoded command included in the encoded code sequence, wherein the encoded command is one byte code and comprises high-order bits indicating combination of a plurality of encoding modes, mid-order bits indicating byte lengths of one encoding mode and low-order bits indicating byte lengths of another encoding mode:

determining, based upon the high-order bits of the encoded command, to which combination of repetition, copying and raw-data substitution the code sequence applies;

decoding each encoded command of the encoded code sequence, in accordance with a result determined in said determining step, by a combination of at least two conversion operations from among repetition, copying and raw-data substitution and by the byte lengths specified by the mid-order bits and the low-order bits; and outputting the decoded data obtained in said decoding step.

2. The method according to claim 1, wherein the repetition is repetition of an identical data byte.

3. The method according to claim 1, wherein the copying is copying of data of an immediately preceding line.

4. The method according to claim 1, wherein the raw data is a direct designation of a data sequence of a given command code.

5. The method according to claim 1, wherein the received code sequence is related to image data of two or more dimensions correlated in horizontal and vertical directions.

6. An encoding method comprising the steps of:

determining, based upon a bit sequence of a given command code, to which of repetition, copying and raw-data substitution the bit sequence applies;

calculating data lengths of each of repetition, copying and raw data substitution based upon a determination performed in said determining step; and in accordance with calculations made in said calculating step, encoding the bit sequence in a unit of one byte encoded command by combining at least two encoding modes from among repetition, copying and raw-data substitution, wherein the one byte encoded command comprises high-order bits indicating combination of a plurality of encoding modes, mid-order bits indicating byte lengths of one encoding mode and low-order bits indicating byte lengths of another encoding mode.

7. The method according to claim 6, wherein the repetition is repetition of an identical data byte.

8. The method according to claim 6, wherein the copying is copying of data of an immediately preceding line.

9. The method according to claim 6, wherein the raw data is a direct designation of a data sequence of a given command code.

10. The method according to claim 6, wherein the given command code is related to image data of two or more dimensions correlated in horizontal and vertical directions.

11. A computer-readable storage medium storing a program for decoding encoded image data of two or more dimensions correlated in horizontal and vertical directions, wherein the program comprises:

code of a step of receiving an encoded code sequence and analyzing an encoded command included in the encoded code sequence, wherein the encoded command is one byte code and comprises high-order bits indicating combination of a plurality of encoding modes, mid-order bits indicating byte lengths of one encoding mode and low-order bits indicating byte lengths of another encoding mode;

code of a step of determining, based upon the high-order bits of the encoded command, to which combination of repetition, copying and raw-data substitution the code sequence applies;

code of a step of decoding each encoded command of the encoded code sequence, in accordance with a result determined by the determining code, by a combination of at least two conversion operations from among repetition, copying and raw-data substitution and by the byte lengths specified by the mid-order bits and the low-order bits; and code of a step of outputting the decoded data by the decoding code.

12. A computer-readable storage medium storing a program for encoding image data of two or more dimensions correlated in horizontal and vertical directions, wherein the program comprises:

code of a step of determining, based upon a bit sequence of a given command code, to which of repetition, copying and raw-data substitution the bit sequence applies;

code of a step of calculating data lengths of each of repetition, copying and raw data substitution based upon a determination by said determining code; and, in accordance with calculations by said calculating code, code of a step of encoding the bit sequence in unit of one byte encoded command by combining at least two encoding modes from among repetition, copying and raw data substitution, wherein the one byte encoded command comprises high-order bits indicating combination of a plurality of encoding modes, mid-order bits indicating byte lengths of one encoding mode and low-order bits indicating byte lengths of another encoding mode.

13. A decoding apparatus comprising:

means for receiving an encoded code sequence and analyzing an encoded command included in the encoded code sequence, wherein the encoded command is one byte code and comprises high-order bits indicating combination of a plurality of encoding mode, mid-order bits indicating byte lengths of one encoding mode and low-order bits indicating byte lengths of another encoding mode;

means for determining, based upon the high-order bits of the encoded command, to which combination of repetition, copying and raw-data substitution the code sequence applies;

means for decoding each encoded command of the encoded code sequence, in accordance with a result determined by said determining means by a combination of at least two conversion operations from among repetition, copying and raw-data substitution and by the byte lengths specified by the mid-order bits and the low-order bits; and;

means for outputting the decoded data obtained in said decoding means.

14. The apparatus according to claim 13, wherein the repetition is repetition of an identical data byte.

15. The method according to claim 13, wherein the copying is copying of data of an immediately preceding line.

16. The method according to claim 13, wherein the raw data is a direct designation of a data sequence of a given command code.

17. The method according to claim 13, wherein the received code sequence is related to image data of two or more dimensions correlated in horizontal and vertical directions.

18. An encoding apparatus comprising:

means for determining, based upon a bit sequence of a given command code, to which of repetition, copying and raw-data substitution the bit sequence applies;

means for calculating data lengths of each of repetition, copying and raw data substitution based upon a determination by said determining means; and, in accordance with calculations by said calculating means, means for encoding the bit sequence in unit of one byte encoded command by combining at least two encoding modes from among repetition, copying and raw-data substitution, wherein the one byte encoded command comprises high-order bits indicating combination of a plurality of encoding modes, mid-order bits indicating byte lengths of one encoding mode and low-order bits indicating byte lengths of another encoding mode.

19. The apparatus according to claim 18, wherein the repetition is repetition of an identical data byte.

20. The method according to claim 18, wherein the copying is copying of data of an immediately preceding line.

21. The method according to claim 18, wherein the raw data is a direct designation of a data sequence of the given command code.

22. The method according to claim 18, wherein the given command code is related to image data of two or more dimensions correlated in horizontal and vertical directions.

* * * * *

UNITED STATES PATENT AND TRADEMARK OFFICE
CERTIFICATE OF CORRECTION

PATENT NO. : 6,785,424 B1 Page 1 of 1
APPLICATION NO. : 09/637626
DATED : August 31, 2004
INVENTOR(S) : Yoichi Sakamoto It is certified that error appears in the above-identified patent and that said Letters Patent is hereby corrected as shown below:

ON THE TITLE PAGE [56] REFERENCES CITED:

Foreign Patent Documents, "JP  8-23447 should read --JP-A  8-23447
                                   JP  8-289157           JP-A  8-289157
                                   JP  9-289591"          JP-A  8-289591--.

SHEET 8:

Figure 8, "ADRESS" should read --ADDRESS--.

COLUMN 12:

Line 37, "count-raw" should read --count_raw--.

Signed and Sealed this

Twenty-first Day of August, 2007

JON W. DUDAS
*Director of the United States Patent and Trademark Office*